(12) United States Patent
Rathjen et al.

(10) Patent No.: US 8,380,374 B2
(45) Date of Patent: Feb. 19, 2013

(54) METHOD FOR NAVIGATING AN UNDERSEA VEHICLE

(75) Inventors: Dirk Rathjen, Bremen (DE); Armin Schmiegel, Hamburg (DE); Robert Engel, Bremen (DE)

(73) Assignee: Atlas Elektronik GmbH, Bremen (DE)

( * ) Notice: Subject to any disclaimer, the term of this patent is extended or adjusted under 35 U.S.C. 154(b) by 716 days.

(21) Appl. No.: 12/531,834

(22) PCT Filed: Feb. 7, 2008

(86) PCT No.: PCT/EP2008/000929
§ 371 (c)(1),
(2), (4) Date: Sep. 18, 2009

(87) PCT Pub. No.: WO2008/113432
PCT Pub. Date: Sep. 25, 2008

(65) Prior Publication Data
US 2010/0106349 A1 Apr. 29, 2010

(30) Foreign Application Priority Data
Mar. 19, 2007 (DE) .......................... 10 2007 012 911

(51) Int. Cl.
*G05D 1/04* (2006.01)

(52) U.S. Cl. ........................................ 701/21; 701/408

(58) Field of Classification Search .................... 701/21, 701/400, 503, 408; 440/12.5; 114/257
See application file for complete search history.

(56) References Cited

U.S. PATENT DOCUMENTS
4,176,338 A * 11/1979 Spindel et al. .................. 367/6
(Continued)

FOREIGN PATENT DOCUMENTS
DE 2901293 A1 7/1980
DE 19548017 12/1995
JP 10054732 2/1998

OTHER PUBLICATIONS
Eric Firing et al., "Deep Ocean Acoustic Doppler Current Profiling", CH2861-3/90/000-0192, IEEE 1990, pp. 192-201.
(Continued)

*Primary Examiner* — Yonel Beaulieu
(74) *Attorney, Agent, or Firm* — Fitch, Even, Tabin & Flannery, LLP

(57) ABSTRACT

In a method for navigating an undersea vehicle (12), navigation data about position, orientation, and absolute vehicle speed of the undersea vehicle (12) are determined from measurement data delivered by navigation sensors (17) via a navigation filter (18) which incorporates the measurement values of a Doppler log (14). To achieve a highly accurate tracking of the course taken by the undersea vehicle (12), particularly during submerging and surfacing phases, the stretch of water (10) traversed by the undersea vehicle (12) is divided into regions (13) which at least in the vertically oriented z-axis have a finite dimension within a Cartesian coordinate system (11). During the voyage of the undersea vehicle (12), the flow rates in the stretch of water (10) in relation to the individual spatial layers (13) are determined and stored from the relative vehicle speeds measured by the Doppler log (14) in successive measurement processes, and from the absolute vehicle speeds issued continuously by the navigation filter (18). The stored flow rates are input into the navigation filter (18) (FIG. 1) in accordance with the respective spatial layer (13) reached by the undersea vehicle (12).

11 Claims, 3 Drawing Sheets

U.S. PATENT DOCUMENTS

| | | | | |
|---|---|---|---|---|
| 5,119,341 | A | * | 6/1992 | Youngberg .................. 367/5 |
| 5,521,883 | A | | 5/1996 | Fage et al. |
| 5,579,285 | A | * | 11/1996 | Hubert .................. 367/133 |
| 4,009,603 | A | | 4/1997 | Steffens |
| 6,118,066 | A | * | 9/2000 | Sirmalis et al. ............. 114/20.1 |
| 7,139,647 | B2 | * | 11/2006 | Larsen ................ 701/21 |
| 7,173,880 | B2 | | 2/2007 | Bernard |
| 7,483,337 | B2 | * | 1/2009 | Basilico .................. 367/128 |
| 2004/0184350 | A1 | | 9/2004 | Brumley et al. |
| 2011/0141853 | A1 | * | 6/2011 | Megdal et al. ............. 367/117 |

OTHER PUBLICATIONS

S.E. Bradley et al., "Long Range Acoustic Correlation Current Profiler", 0-7803-0838-7/92, IEEE 1992, pp. 648-653.

Ura T et al: "On-site INS update of an AUV r2D4 by SSBL based position estimation" Nov. 9, 2004, Oceans '04. MTTS/IEEE Techno-Ocean '04 Kobe, Japan Nov. 9-12, 2004, Piscataway, NJ, USA,IEEE, pp. 1606-1611.

Garau B et al: "AUV navigation through turbulent ocean environments supported by onboard H-ADCP" May 15, 2006 Robotics and Automation, 2006. ICRA 2006. Proceedings 2006 IEEE Intern Ational Conference on Orlando, FL, USA May 15-19, 2006, Piscataway, NJ, USA,IEEE, pp. 3556-3561.

Odegaard O T: "Application potential, error considerations and post-processing software for ADCP deployments on AUVs" Nov. 9, 2004, Oceans '04. MTTS/IEEE Techno-Ocean '04 Kobe, Japan Nov. 9-12, 2004, Piscataway, NJ, USA,IEEE, pp. 1435-1443.

* cited by examiner

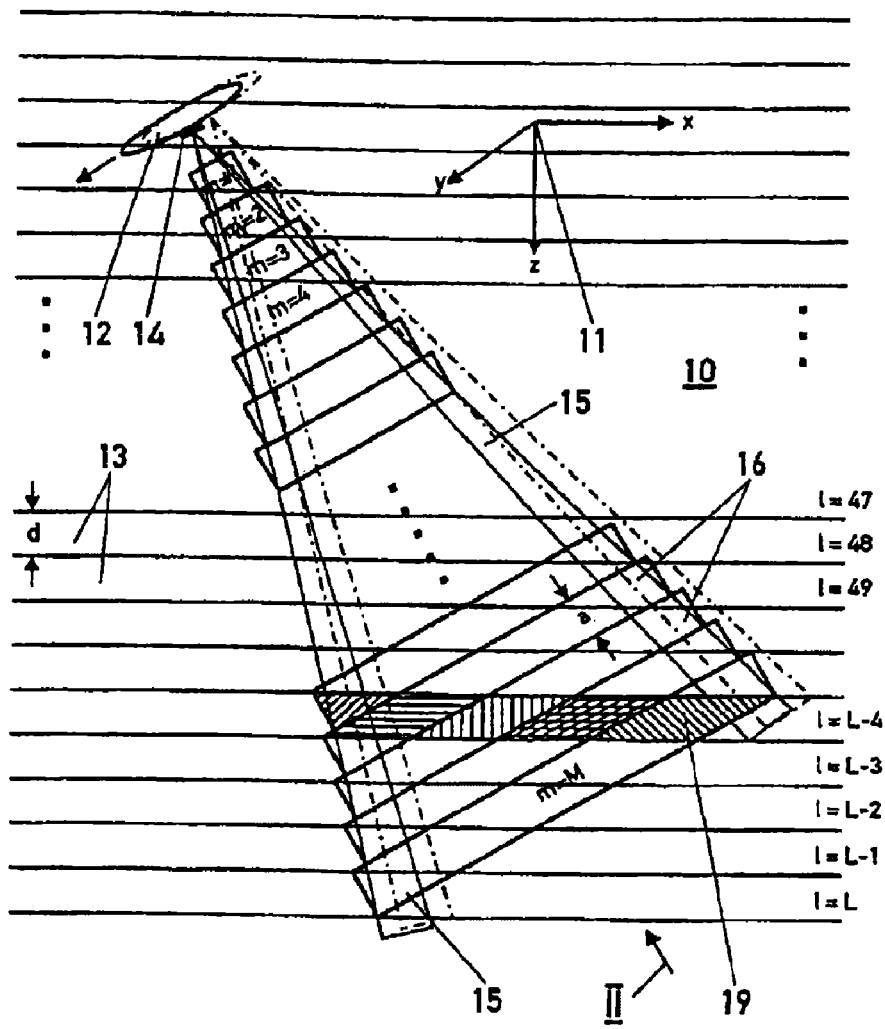
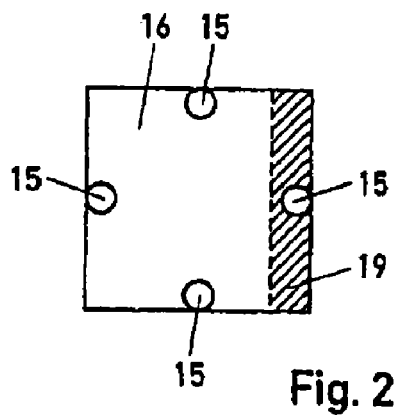
Fig. 1
Fig. 2

METHOD FOR NAVIGATING AN UNDERSEA VEHICLE

CROSS-REFERENCE TO RELATED APPLICATIONS

This is a U.S. National Phase of International Application PCT/EP2008/000929, filed Feb. 7, 2008, and claims the benefit of foreign priority under 35 U.S.C. §119 of German Patent Application No. 10 2007 012 911.6, filed Mar. 19, 2007, the entire disclosures of which are hereby incorporated by reference herein.

SUMMARY OF THE INVENTION

1. Field of the Invention

The invention relates to a method for navigating an undersea vehicle.

2. Background and Description of Related Art

Navigating watercraft involves determining the distance covered by the watercraft over ground, with the result that the position of said watercraft in terms of geographical length and width is known at any time.

Known navigation systems for undersea vehicles generally have an inertial measuring device which makes it possible to measure rates of rotation and accelerations. Since this enables precise navigation only for very short periods of time, support by means of additional sensors is always needed. For undersea vehicles, these are mainly GPS when the undersea vehicle has surfaced, pressure sensors, Doppler logs and acoustic tracking systems. Such integrated navigation systems are described, for example, in Titterton, T. H., Weston, J. L.: "strapdown inertial navigation technology"; Peter Peregrinus, London 1997, Chapter 12.

In deep sea areas in which the Doppler log does not measure with respect to the ground but rather only with respect to the surrounding water on account of its range, the vehicle speed over ground can be inferred from the so-called relative vehicle speed measured by the Doppler log if the water current is known. The necessary values for the water current are taken from so-called current charts which have been created for well-traveled sea areas. So-called navigation filters are used for navigation, the output variables of the sensors, such as the inertial measuring device and the Doppler log, as well as the water current values shown for the respective sea areas being input to said navigation filters and said navigation filters providing the values of the absolute vehicle speed over ground, of the instantaneous position and of the orientation or attitude of the watercraft, which values are more or less accurate for vehicle navigation. The practice of including the a priori knowledge of the current in the sea area in the navigation filter is described, for example, in: N. Vasquez, M. J. Rendas "Using a priori Current Knowledge on AUV-Navigation", IEEE 1998, 0-7803-5045-6/98.

The problem of the inertial navigation system not being able to be supported by speed measurements with respect to the ground at a great water depth by means of the Doppler log which is usually used in conjunction with an inertial navigation system occurs in undersea vehicles, in particular during the submerging and surfacing phases. Rather, the Doppler log then operates in the so-called water track mode, that is to say measures the vehicle speed with respect to the surrounding water. Since the undersea vehicle moves with the water current which may be considerable relative to the speed of the undersea vehicle, water currents are not recorded when measuring the speed. Whereas the inertial navigation system measures its acceleration values in relation to an inertial system, the Doppler log measures in relation to the current surrounding the undersea vehicle, that is to say in a possibly accelerated reference system. Consequently, the Doppler log which measures through water does not detect any acceleration when diving through a current gradient. This results in inconsistent measurements and thus potentially in instabilities in the navigation filter. A priori knowledge of the water currents is generally not available since AUVs are essentially used for exploration in deep water and no reliable details of the currents at different sea depths are available.

The invention is based on the object of improving a method for navigating an undersea vehicle in such a manner that the distance actually covered by the undersea vehicle is determined in a very precise manner.

In one of its aspects, a method for navigating an undersea vehicle (12) involves determining navigation data relating to the position, attitude and absolute vehicle speed of the undersea vehicle (12) from measurement data provided by navigation sensors (17) by means of a navigation filter (18) which includes the measured values from a Doppler log (14). The Doppler log (14) can measure relative vehicle speeds, such as in successive measuring operations, and output the data for storage in the navigation filter (18). The navigation filter (18) uses navigation data from navigation sensors (17) and can provide navigation data at intervals of time. The navigation filter (18) can continuously store and provide output data regarding absolute vehicle speeds.

Accordingly, in one of its aspects, a method for navigating an undersea vehicle includes subdividing the water area (10) through which the undersea vehicle (12) travels into regions having a finite dimension (d) at least in the vertically oriented z axis of a Cartesian coordinate system (11), determining the currents ($_i$s) in the water area (10) inside the individual regions, at least during the submerging and/or surfacing phase of the undersea vehicle (12), from the relative vehicle speeds ($w_m''$) measured by the Doppler log (14) in successive measuring operations, the absolute vehicle speeds ($v_F(t_n)$) continuously output by the navigation filter (18) and are stored, and in that the stored region-specific currents ($_i$s) are input to the navigation filter (18) on the basis of the region through which the undersea vehicle (12) is respectively instantaneously traveling.

The method according to the invention has the advantage that the existing Doppler log is used not only to measure the relative vehicle speed with respect to the surrounding water but also to continuously determine the instantaneous water current during the mission journey in the area in which the undersea vehicle is used. A continuously updated current profile is thus created at short intervals for the water area through which the undersea vehicle travels. The absolute vehicle speed which provides a reliable support value for the inertial navigation system results from the relative vehicle speed measured by the Doppler log, and the current value for the instantaneous location of the undersea vehicle, which current value is taken from the continuously updated current profile. Considerably improved position values for the undersea vehicle are thus obtained from the navigation filter, in particular for the submerging and surfacing operations of the undersea vehicle.

Further, other aspects a method according to the invention, advantages, developments and refinements of the invention are described and claimed herein.

BRIEF DESCRIPTION OF THE DRAWINGS

The invention is described in more detail below using an exemplary embodiment which is illustrated in the drawing, in which:

FIG. 1 shows a sketch of a vertical section of a water area which is fictitiously subdivided into horizontal space layers with a fixed layer thickness and through which a submerging undersea vehicle travels and of the measurement range of a Doppler log which is arranged on the undersea vehicle and is subdivided into measuring cells which are adjacent to one another in the direction of measurement, FIG. 2 shows a miniaturized plan view of the last measuring cell in the direction of arrow II in FIG. 1.

DETAILED DESCRIPTION OF THE INVENTION

Figure 3:
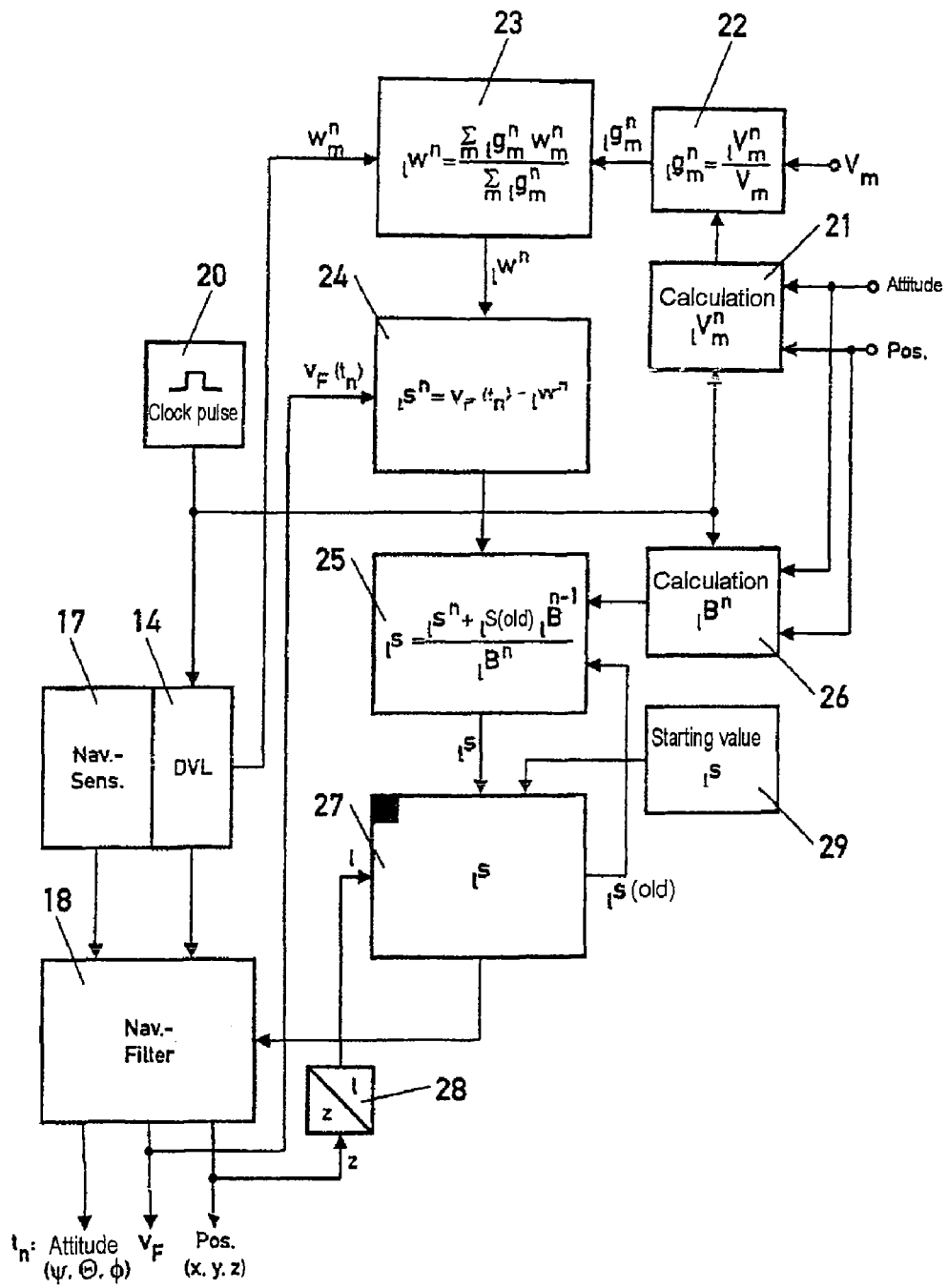
FIG. 3 shows a block diagram for illustrating the navigation method during the submerging operation of the undersea vehicle.

FIG. 1 illustrates sections of a water area 10 in a vertical section, that is to say in a sectional plane in the z/x plane of a coordinate system 11 whose z axis is vertically oriented, in which a diagrammatically sketched undersea vehicle 12 submerges in the direction of the seabed. The water area 10 is fictitiously divided into regions having at least one dimension which is finite in the z axis of the coordinate system 11. In the exemplary embodiment in FIG. 1, space layers which are vertically above one another and preferably have the same layer thickness d are selected as regions. The space layers 13 are numbered l=1, 2, . . . L, starting from the surface of the water down to the seabed. The undersea vehicle 12 is provided with a Doppler log 14. The structure and method of operation of a Doppler log are known and are described, for example, in DE 29 01 293. The Doppler log measures the magnitude and direction of the relative vehicle speed using four sound cones 15 which are oriented in different directions and are inclined downward with respect to the longitudinal axis of the undersea vehicle 12 fore and aft and with respect to the vehicle transverse axis to port and starboard. Only two of the sound cones 15 can be seen in FIG. 1. The four sound cones 15 delimit a measurement range of the Doppler log 14, which range is diagrammatically illustrated in FIG. 1. This measurement range is subdivided into measuring cells 16 which are adjacent to one another as seen in the direction of measurement and preferably have the same cell depth a. FIG. 2 illustrates a plan view of a measuring cell 16 with the sound cones 15 which laterally delimit the measuring cell 16. A sound pulse emitted by the transmitting device of the Doppler log 14 is scattered in the water in each measuring cell 16 and the scattered Doppler-shifted sound pulse is received in the receiving device of the Doppler log 14. The propagation time of the sound pulse can be used to determine the association of the latter with each measuring cell 16 and the vehicle speed with respect to the volume of water in each measuring cell 16 can be calculated from the Doppler shift. The measuring cells 16 are numbered m=1, 2, . . . M. Each sound pulse emitted and received by the Doppler log 14 initiates a measuring operation for the vehicle speeds in the measuring cells 16. The measuring operations are numbered n=1, 2, . . . N.

The undersea vehicle 12 has navigation sensors 17, for example an inertial measuring device, and a navigation filter 18 which uses the measurement data from the navigation sensors 17 to provide navigation data at particular intervals of time. Such navigation data are: position, absolute vehicle speed and attitude or orientation of the undersea vehicle 12, which is defined by the heading angle $\Psi$, the pitch angle $\theta$ and the roll angle $\Phi$ (FIG. 3). In order to precisely calculate these navigation data even over relatively long periods of time, these data are supported with measured values of the vehicle speed from the Doppler log 14. For this purpose, the navigation filter 18 is supplied with the relative vehicle speed with respect to water, which is measured by the Doppler log 14, and additionally a priori knowledge of the water current, that is to say the water speed in the space layer 13 in which the undersea vehicle 12 is currently located. This a priori knowledge of the current conditions in the individual space layers 13 of the water area 10 is determined during the journey of the undersea vehicle 12 (during the diving operation in the exemplary embodiment in FIG. 1) in the following manner:

A measuring operation is initiated with each activation pulse from a clock generator 20 (FIG. 3) at short intervals of time which are preferably shorter than 1 sec. by the Doppler log 14 emitting and receiving a sound pulse. Each measuring operation is recorded with a consecutive number n=1, 2, . . . N. During each measuring operation n, the Doppler log 14 measures, for each measuring cell 16 with the number m=1, 2, . . . M, the relative vehicle speed $w_m^n$, that is the vehicle speed with respect to the volume of water in the measuring cell 16, which is called the measuring-cell-specific relative vehicle speed $w_m^n$ below. The measuring-cell-specific relative vehicle speeds $w_m^n$ from each measuring operation are transformed into those regions of the water area 10 which are in the form of space layers 13 in association with the respective number n of the measuring operation. The current $_l s^n$ in the space layer 13 with the number l for the measuring operation n is calculated from each region-specific relative vehicle speed $_l w^n$, which is respectively valid for a space layer 13 and is produced by the transformation, with the aid of the absolute vehicle speed $v_F(t_n)$ output by the navigation filter 18 at the time $t_n$ of the measuring operation n. The current $_l s$ which is specific to the respective space layer 13 and is called the region-specific current $_l s$ below is derived from all measuring operations n which resulted in the calculation of a current $_l s^n$ in the respective space layer 13 with the number l by averaging the calculated currents $_l s^n$ and is stored. The region-specific currents $_l s$ stored for all space layers 13 form the a priori knowledge of the current profile in the water area 10. In a manner corresponding to the instantaneous position of the undersea vehicle 12, which position is output by the navigation filter 18, the respective current value is called from the memory 27 and is supplied to the navigation filter 18, for which purpose the position of the undersea vehicle 12 is used to determine in advance the number l of the space layer 13 in which the undersea vehicle 12 is located.

A suitable orientation of the Doppler log 14 ensures that the undersea vehicle 12, during its diving journey, always enters a space layer 13 for which the current $_l s$ has previously been determined in the manner described. If it is assumed that the current is constant inside each space layer 13, which is generally the case, a large angular range is available for the orientation of the Doppler log 14 arranged on the bottom of the hull of the undersea vehicle 12 since the space layers 13 are not delimited in the layer plane. The Doppler log 14 is preferably arranged in such a manner that its direction of measurement points downward approximately at right angles to the vehicle axis, as illustrated in FIG. 3. This has the advantage that, when the undersea vehicle 12 travels horizontally at the diving depth close to the seabed, the Doppler log 14 measures the absolute vehicle speed with respect to the ground and provides very reliable support values for the navigation filter 18.

In order to obtain the region-specific relative vehicle speeds $_l w^n$ and the region-specific currents $_l s$, the following method steps are carried out in the processing blocks illustrated in FIG. 3:

All adjacent measuring cells 16 which intersect the same space layer 13 are used when transforming the measuring-cell-specific relative vehicle speeds $w_m^n$ measured by the Doppler log 14 into a region-specific relative vehicle speed $_l w^n$ for a space layer 13 with the number l. In the exemplary embodiment in FIG. 1, the adjacent measuring cells 16 with the numbers m=M, m=M−1, m=M−2, m=M−3 and m=M−4 intersect the space layer 13 with the number l=L−4, for example. These measuring cells 16 are thus decisive for the measuring-cell-specific relative vehicle speeds $w_m^n$ to be transformed in order to obtain the region-specific relative vehicle speed $_{L-4} w^n$ in the space layer 13 with the number l=L−4. In block 21, the sectional volume $_l V_m^n$ of the measuring cell 16 and the space layer 13 with the number l=1, 2, ... L is first of all calculated in each new measuring operation with the number n=1, 2, ... N for each measuring cell 16 with the number m=1, 2, ... M. In this case, the sectional volume is the volume which the respective measuring cell 16 cuts from a space layer 13 or the volume which is common to a measuring cell 16 and a space layer 13. This sectional volume depends on the shape or form of the measuring cell 16, which is constant for each measuring cell 16, and on the orientation of the measurement range of the Doppler log 14, that is to say the direction of measurement which in turn depends on the position and attitude of the undersea vehicle 12. A weighting factor $_l g_m^n$ is derived from this sectional volume $_l V_m^n$ for each measuring operation n. This weighting factor $_l g_m^n$ is calculated in block 22 according to $$_1 g_m^n = \frac{_1 V_m^n}{V_m}. \tag{1}$$

These weighting factors are used in block 23 to transform the measuring-cell-specific relative vehicle speeds $w_m^n$ obtained in each measuring operation n. First of all, the measuring-cell-specific relative vehicle speeds $w_m^n$ determined on the basis of the existing points of intersection between the measuring cells 16 and the respective space layers 13 for the purpose of transformation are multiplied by the respective associated weighting factor $_l g_m^n$. The sum of all these measuring-cell-specific relative vehicle speeds multiplied by the respective weighting factor is then formed and is divided by the sum of the weighting factors according to equation (2) below $$_1 w^n = \frac{\sum_m {_1 g_m^n \cdot w_m^n}}{\sum_m {_1 g_m^n}}. \tag{2}$$

In order to illustrate the transformation operation described, the sectional volumes $_l V_m^n$ of all of the measuring cells 16 which intersect the space layer 13 with the number l=L−4 are illustrated by way of example in FIG. 1 using different hatching. These are the measuring cells 16 with the numbers m=M−4, m=M−3, m=M−2, m=M−1 and m=M. The measuring operation n=N, for example, was used to measure the measuring-cell-specific relative vehicle speed $w_{M-4}^N$ in the measuring cell 16 where m=M−4 as well as the measuring-cell-specific relative vehicle speed $w_{M-3}^N$ in the measuring cell 16 where m=M−3 as well as the measuring-cell-specific relative vehicle speed $w_{M-2}^N$ in the measuring cell 16 where m=M−2, etc. By way of example, in FIG. 1, the sectional volume $_{L-4} V_{M-3}^N$ for the measuring cell 16 where m=M−3 is illustrated using horizontal hatching, the sectional volume $_{L-4} V_{M-2}^N$ for the measuring cell 16 where m=M−2 is illustrated using vertical hatching, etc. The hatched sectional volume $_{L-4} V_M^N$ of measuring cell 16 with the number m=M and space layer 13 with the number l=L−4, which is designated 19 in FIG. 1, is also found in FIG. 2 and is shown as a hatched area 19 there. The weighting factors $_{L-4} g_{M-4}^N$, $_{L-4} g_{M-3}^N$ etc. thus respectively result as the quotient of the sectional volumes $_{L-4} V_{M-4}^N$, $_{L-4} V_{M-3}^N$ etc. and the volumes $V_{M-4}$, $V_{M-3}$ etc. of the measuring cells 16 with the numbers m=M−4, m=M−3 etc. According to equation (2), the region-specific relative vehicle speed in the space layer 13 with the number l=L−4 thus results from the relative vehicle speeds in the measuring cells 16 with the numbers m=M−4, m=M−3, m=M−2, m=M−1 and m=M as $$_{L-4} w^N = \frac{_{L-4} g_{M-4}^N \cdot w_{M-4}^N + _{L-4} g_{M-3}^N \cdot w_{M-3}^N + _{L-4} g_{M-2}^N \cdot w_{M-2}^N + _{L-4} g_{M-1}^N \cdot w_{M-1}^N + _{L-4} g_M^N \cdot w_M^N}{_{L-4} g_{M-4}^N + _{L-4} g_{M-3}^N + _{L-4} g_{M-2}^N + _{L-4} g_{M-1}^N + _{L-4} g_M^N}. \tag{3}$$

In block 24, the current $_l s^n$ is calculated for the measuring operation with the number n from the region-specific relative vehicle speed $_l w^n$ calculated in the manner described above and the absolute vehicle speed $v_F(t_n)$ output by the navigation filter 18 at the time $t_n$ of the measuring operation with the numbering n=1, 2, ... N by respectively subtracting the region-specific relative vehicle speed $_l w^n$ from the absolute vehicle speed $v_F(t_n)$ according to $$_l s^n = v_F(t_n) - _l w^n \tag{4}.$$

In block 25, the region-specific current $_l s$ which is valid for the space layer 13 with the numbering l=1, 2, ... L is derived from the currents $_l s^n$ for the space layer 13 with the numbering l=1, 2, ... N which are calculated during each measuring operation n. For this purpose, all currents $_l s^n$ obtained for the same space layer 13 in all measuring operations up to and including the instantaneous measuring operation are averaged, that is to say added and divided by the total number $_l B^n$ of current values obtained for the same space layer 13, including the currently calculated current value.

In order to reduce the storage capacity needed to store all of the current values obtained for each of the space layers 13, only the instantaneous region-specific current $_l s$ is respectively stored, the previously determined region-specific current $_l s$ (old) for the same space layer 13 respectively being overwritten with the currently determined region-specific current $_l s$ after the previously determined region-specific current $_l s$ (old) has been used to determine the instantaneous region-specific current $_l s$. For this purpose, block 26 calculates a factor $_l B^n$ which records the number of measuring operations, counted up to the instantaneous measuring operation, which have been carried out in the space layer 13 with the number l and have resulted in a current value $_l s^n$. The number of measuring operations carried out in a space layer 13 is dependent, on the one hand, on the range of the Doppler log 14 and, on the other hand, on the instantaneous position and attitude of the undersea vehicle 12. This factor $_l B^n$ is used to obtain the region-specific current $_l s$ for the space layer 13 with the numbering l=1, 2, ... L from the current $_l s''$ calculated in the measuring operation with the number n according to $$_l s = \frac{_l s^n + _l s(\text{old}) \cdot _l B^{n-1}}{_l B^n}. \quad (5)$$

In this case, $_l s$ (old) is the last region-specific current $_l s$ previously obtained for the space layer 13 with the number l according to equation (5), whereas $_l s''$ is the current calculated for the space layer 13 with the number l in the instantaneous measuring operation with the number n according to equation (4).

The region-specific current $_l s$ determined in block 25 is written to the memory 27 under the number l of the respective space layer 13 and is updated with each next measuring operation for each space layer 13. The memory thus stores, in association with the space layer subdivision carried out in FIG. 1, an instantaneous current profile which shows the current values $_l s$ where l=1, 2, ... L in the different space layers 13 in a highly accurate manner. If the undersea vehicle 12 is located in one of these space layers 13, the value of the water current which acts on the undersea vehicle 12 at the instantaneous position of the latter is also delivered to the navigation filter 18 from the current profile memory 27, in addition to the relative vehicle speed provided by the Doppler log 14, in order to support the navigation data. For this purpose, the corresponding number l of that space layer 13 in which the z component of the vehicle position falls is calculated in block 28 from the z component of the vehicle position which is output by the navigation filter 18. The relevant current $_l s$ is read from the memory 27 using this layer number l and is supplied to the navigation filter 18.

It goes without saying that the described method of continuously determining and updating the currents $_l s$, which occur in the different space layers 13 of the water area 10, as the undersea vehicle 12 travels in its straight-ahead direction requires starting values which indicate the starting position of the undersea vehicle 12 and the water current at the starting location. In the case of an undersea vehicle 12 which has surfaced, the starting position can be determined in a very accurate manner using a GPS, for example. The water current estimated or measured at the starting location is input, as a first value, to the memory 27 association with the numbers l of those space layers 13 which are recorded by the measurement range of the Doppler log 14 in the starting position of the undersea vehicle 12. The memory locations in the memory 27 for the deeper space layers 13 are filled with "0", with the result that a first current profile with respect to the water depth, which is subdivided into space layers 13, is stored in the memory 27. These starting values for the region-specific currents are read into the memory 27 from block 29 in FIG. 3.

Figure 4:
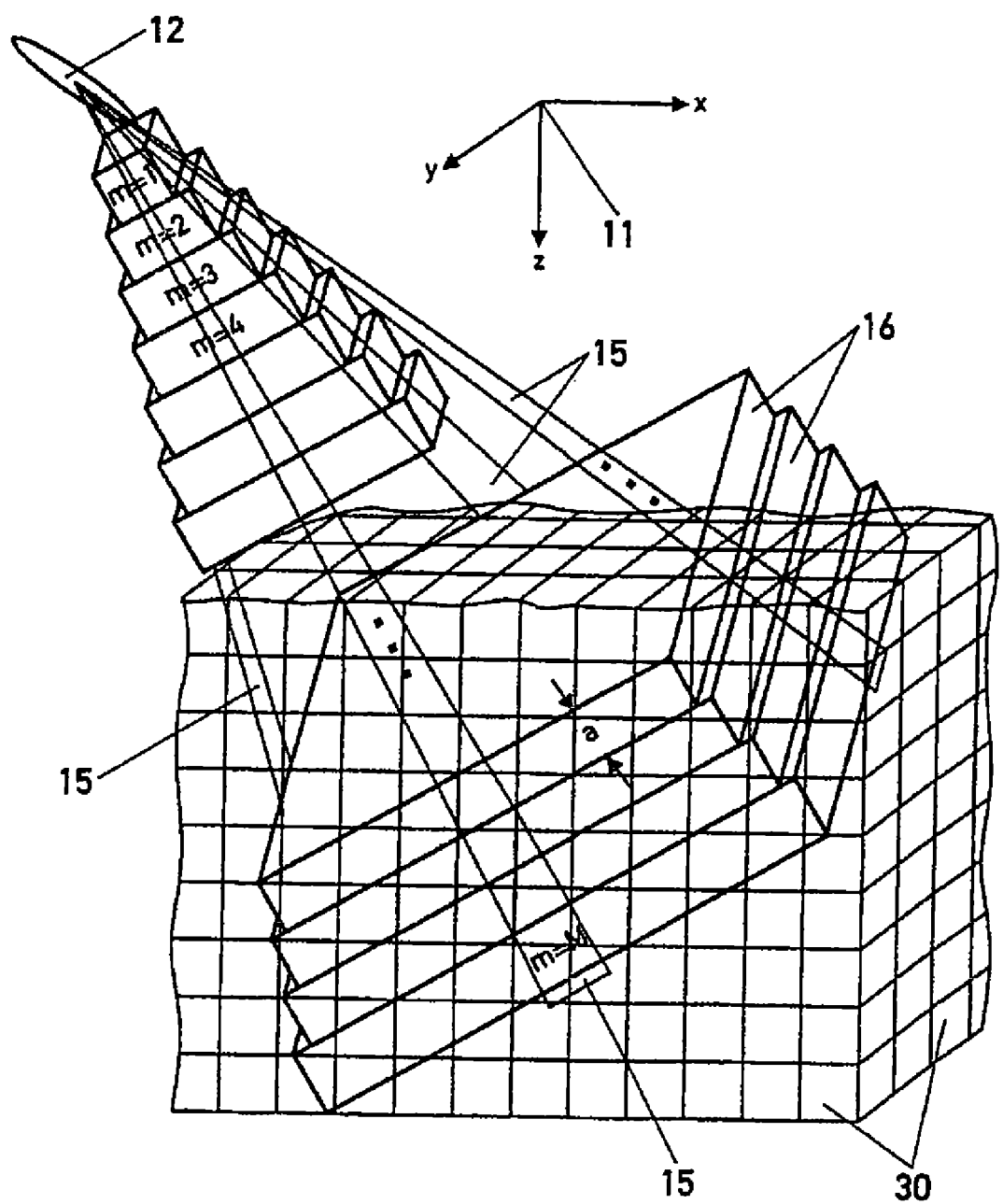
FIG. 4 shows a sketch of a perspective illustration of the water area which is fictitiously subdivided in sections into space cells with constant dimensions and of the measurement range of the Doppler log, which measurement range has been subdivided into measuring cells.

In the example illustrated in FIG. 1, it is assumed that the water current inside a space layer 13 is independent of the location. If this assumption cannot be made, that is to say a location-dependent current inside the space layers 13 can be assumed, the water area 10 is not subdivided into space layers 13 but rather into space cells 30 which are adjacent to one another and have a finite dimension not only in the z axis but also in the x axis and y axis of the Cartesian coordinate system 11, as illustrated in FIG. 4. The dimensions of all space cells 30 are preferably selected to be the same. The above-described measurement of the measuring-cell-specific relative vehicle speeds is carried out in the same manner and the determination of the region-specific currents which is based thereon is carried out in the same manner but is based on the individual space cells 30 which represent the regions of the water area 10. The current values stored in association with the space cells 30 are then read selectively depending on the space cell 30 in which the instantaneous position of the undersea vehicle 12 falls and are input to the navigation filter 18.

Since it must also be ensured in the exemplary embodiment of the subdivision of the water area (illustrated in FIG. 4) that a value for the water current prevailing in the space cell 30 is already available for each space cell 30 entered by the undersea vehicle 12 during its submerging or surfacing journey, very much narrower limits are placed on the orientation of the Doppler log 14 when it is being fitted to the undersea vehicle 12. During the diving journey (and also during surfacing) of the undersea vehicle 12, as illustrated in FIG. 4, the direction of measurement of the Doppler log 14 must be largely directed in the straight-ahead direction of the undersea vehicle 12, whereas, when traveling at a diving depth which has been reached, a direction of measurement of the Doppler log 14 which is inclined at an acute to right angle with respect to the direction of travel is desirable for measuring the vehicle speed over ground. The Doppler log 14 must therefore be fitted to the hull of the vehicle such that it can be pivoted or separate Doppler logs must be provided for the speed measurements during the submerging and surfacing phases, on the one hand, and during the mission journey at a diving depth which has been reached, on the other hand.

The invention claimed is:

1. A method for navigating an undersea vehicle (12), having navigation sensors (17) for measuring and continuously outputting data of the absolute speed of the undersea vehicle, a Doppler log (14) for measuring the relative speed of the undersea vehicle in successive measuring operations, and a navigation filter (18) for calculating navigation data relating to the position, attitude and absolute vehicle speed of the undersea vehicle (12) using data from navigation sensors (17) and the measured relative speed values from the Doppler log (14), said method comprising:

subdividing the water area (10) through which the undersea vehicle (12) travels into regions having a finite dimension (d) at least in the vertically oriented z axis of a Cartesian coordinate system (11);

determining currents in the water area inside the regions and storing determined currents as region-specific currents ($_l s$), at least during the submerging and/or surfacing phase of the undersea vehicle (12), wherein said region specific currents ($_l s$) are determined from the relative vehicle speeds ($w_m''$) measured by the Doppler log (14) in successive measuring operations and the absolute vehicle speeds ($v_F(t_n)$) continuously output by the navigation filter (17);

inputting said stored region-specific currents ($_l s$) to the navigation filter (18) dependent upon the region through which the undersea vehicle (12) is respectively instantaneously traveling; and calculating said navigation data.

2. The method as claimed in claim 1, wherein the measurement range of the Doppler log (14) is subdivided into measuring cells (16) which are adjacent to one another in the direction of measurement and preferably have the same cell depth (a) as seen in the direction of measurement, in that the relative vehicle speed ($w_m''$) is determined for each measuring cell (16) in each measuring operation, and the measuring-cell-specific relative vehicle speeds ($w_m''$) are transformed into the regions of the water area (10) in association with the measuring operations, and in that, in each measuring operation in each region of the water area (10), the current ($_l s''$) is calculated from the region-specific relative vehicle speed ($_{i}w''$) produced by the transformation of the measuring-cell-specific relative vehicle speeds and the absolute vehicle speed ($v_F(t_n)$) output by the navigation filter (18) at the time ($t_n$) of the measuring operation, and the region-specific current ($_{i}s$) is derived from the currents ($_{i}s''$) calculated for the respective region in all measuring operations and is stored.

3. The method as claimed in claim 2, wherein in order to transform the measuring-cell-specific relative vehicle speeds ($w_m''$), the respective measuring-cell-specific relative vehicle speeds ($w_m''$) of those measuring cells (16) which have a sectional volume ($_{i}v_m''$) with the same region, said speeds emerging from the same measuring operation (n), are weighted and the sum of the weighted relative vehicle speeds is divided by the sum of the weightings, and in that the transformation result is output in the form of a region-specific relative vehicle speed ($_{i}w''$) in the respective region.

4. The method as claimed in claim 3, wherein in order to weight the measuring-cell-specific relative vehicle speeds ($w_m''$), the latter are respectively multiplied by a weighting factor ($_{i}g_m''$), in that the respective weighting factor ($_{i}g_m''$) is calculated as the quotient of the sectional volume ($_{i}V_m''$) cut from the region by the respective measuring cell (16) and the volume ($V_m$) of the respective measuring cell (16), and in that the sum of the weighting factors ($_{i}g_m''$) represents the sum of the weightings.

5. The method as claimed in claim 1, wherein in order to derive the region-specific currents ($_{i}s$), all currents ($_{i}s''$) calculated for the respective region in all measuring operations, including the instantaneous measuring operation, are averaged.

6. The method as claimed in claim 5, wherein the previously derived last region-specific current ($_{i}s$ (old)) is multiplied by the total number ($_{i}B''^{-1}$) of measuring operations carried out in the region, said number being reduced by "1", is added to the current ($_{i}s''$) calculated in the respective measuring operation and is divided by the total number ($_{i}B''$) of measuring operations carried out in the region.

7. The method as claimed in claim 1, wherein the regions are space layers (13) which are above one another in the vertical direction and preferably have the same layer thicknesses (d).

8. The method as claimed in claim 1, wherein the regions are space cells (30) which are adjacent to one another in the x, y and z directions of the Cartesian coordinate system (11) and preferably have the same dimensions.

9. The method as claimed in claim 1, wherein each measuring operation is initiated by the Doppler log (14) emitting a sound pulse.

10. The method as claimed in claim 9, wherein the number ($_{i}B''$) of measuring operations carried out in a region is calculated from the number of emitted sound pulses, the range of the Doppler log (14) and the attitude and position of the watercraft (12).

11. The method as claimed in claim 1, wherein the Doppler log (14) generates at least four sound cones (15) which are preferably inclined by the same angles in different directions with respect to the longitudinal and transverse axes of the undersea vehicle (12), and in that the measurement range is delimited by the sound cones (15) transversely with respect to the direction of measurement.

* * * * *